(12) United States Patent
Tuzel et al.

(10) Patent No.: US 9,836,820 B2
(45) Date of Patent: Dec. 5, 2017

(54) IMAGE UPSAMPLING USING GLOBAL AND LOCAL CONSTRAINTS

(71) Applicant: Mitsubishi Electric Research Laboratories, Inc., Cambridge, MA (US)

(72) Inventors: Oncel Tuzel, Winchester, MA (US); Yuichi Taguchi, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 75 days.

(21) Appl. No.: 15/059,629

(22) Filed: Mar. 3, 2016

(65) Prior Publication Data

US 2017/0256033 A1  Sep. 7, 2017

(51) Int. Cl.
*G06T 3/40* (2006.01)
*G06K 9/66* (2006.01)
*G06T 5/00* (2006.01)
*G06K 9/62* (2006.01)
*G06K 9/52* (2006.01)
*H04N 19/136* (2014.01)
*G06K 9/00* (2006.01)

(52) U.S. Cl.
CPC ........ *G06T 3/4053* (2013.01); *G06K 9/00255* (2013.01); *G06K 9/52* (2013.01); *G06K 9/6256* (2013.01); *G06K 9/66* (2013.01); *G06T 3/4046* (2013.01); *G06T 5/00* (2013.01); *H04N 19/136* (2014.11); *G06T 3/4007* (2013.01); *G06T 2207/20024* (2013.01); *G06T 2207/20081* (2013.01); *G06T 2207/20084* (2013.01); *G06T 2207/20172* (2013.01); *G06T 2207/30201* (2013.01)

(58) Field of Classification Search
CPC ..................... G06T 3/4053; G06T 5/00; G06T 2207/20024; G06T 2207/20081; G06T 2207/20084; G06T 2207/20172; G06T 2207/30201; G06K 9/00255; G06K 9/52; G06K 9/6256; G06K 9/66; H04N 19/136
See application file for complete search history.

(56) References Cited

U.S. PATENT DOCUMENTS 6,233,365 B1 * 5/2001 Teruhiko ................. G06T 3/403
                                                                 382/156
7,187,811 B2   3/2007 Lin et al.
(Continued)

OTHER PUBLICATIONS

Nasrollahi et al. ("Deep learning based super-resolution for improved action recognition," Image Processing Theory, Tools and Applications, Nov. 10-13, 2015).*
(Continued)

*Primary Examiner* — Yubin Hung
(74) *Attorney, Agent, or Firm* — Gene Vinokur; James McAleenan; Hironori Tsukamoto

(57) ABSTRACT

A method upsamples an image using a non-linear fully connected neural network to produce only global details of an upsampled image and interpolates the image to produce a smooth upsampled image. The method concatenates the global details and the smooth upsampled image into a tensor and applies a sequence of nonlinear convolutions to the tensor using a convolutional neural network to produce the upsampled image.

20 Claims, 9 Drawing Sheets

(56) References Cited

U.S. PATENT DOCUMENTS

| | | | | |
|---|---|---|---|---|
| 2004/0184657 | A1* | 9/2004 | Lin | G06T 3/4046 382/159 |
| 2004/0260662 | A1* | 12/2004 | Staelin | G06N 3/08 706/16 |
| 2005/0220355 | A1* | 10/2005 | Sun | G06T 3/4007 382/254 |
| 2009/0022414 | A1* | 1/2009 | Wei | G06T 5/008 382/254 |
| 2013/0028538 | A1 | 1/2013 | Simske et al. | |
| 2015/0363634 | A1* | 12/2015 | Yin | G06K 9/00221 382/118 |
| 2016/0328630 | A1* | 11/2016 | Han | G06K 9/4628 |
| 2017/0132758 | A1* | 5/2017 | Paluri | G06T 3/4046 |

OTHER PUBLICATIONS

Iqbal et al. ("Unification of image fusion and super-resolution using jointly trained dictionaries and local information contents," IET Image Processing, vol. 6, Issue 9; Dec. 2012).*

Abbiss et al. ("Super-resolution and neural computing," SPIE, vol. 880, 1988).*

Sekiwa et al. ("Enlargement of digital image by Laplacian pyramid using neural networks," Electronics and Communications in Japan, Part 3, vol. 82, No. 1, 1999).*

Taguchi et al. ("Enlargement of Digital Images by Using Multi-Neural Networks," SPIE vol. 364, 1999).*

Davila et al.("Superresolution of Binary Images With a Nonlinear Interpolative Neural Network", Applied Optics, vol. 39, No. 14, May 10, 2000, pp. 2291-2299).*

E. Zhou, H. Fan, Z. Cao, Y. Jiang, and Q. Yin. Learning face hallucination in the wild. In Twenty-Ninth AAAI Conference on Artificial Intelligence, 2015.

C. Liu, H.-Y. Shum, and W. T. Freeman. Face hallucination: Theory and practice. International Journal of Computer Vision, 75(1):115-134, 2007.

Tuzel et al. "Global Local Face Upsampling Network," Mar. 23, 2016, pp. 1-23. Retrieved from the Internet, https://arxiv.org/abs/1603.07235v1. (retrieved on May 3, 2017).

Ce Liu et al. "Face Hallucination: Theory and Practice," International Journal of Computer Vision, Kluwer Academic Publishers, BO, vol. 75, No. 1, Feb. 15, 2007, pp. 115-134. XP019534971.

Dong Chao et al. "Image Super-Resolution using Deep Convolutional Networks," IWWW Transactions on Pattern Analysis and Machine Intelligence, IEEE Computer Society, USA. vol. 38, No. 2. Feb. 1, 2016. pp. 295-307. XP011591233.

* cited by examiner

IMAGE UPSAMPLING USING GLOBAL AND LOCAL CONSTRAINTS

FIELD OF THE INVENTION

This invention relates generally to image processing and more particularly to upsampling an image to produce a high-resolution image from a low-resolution image.

BACKGROUND OF THE INVENTION

Face upsampling (super-resolution) is the task of generating a high-resolution face image from a low-resolution input image which has widespread application in surveillance, authentication and photography. Face upsampling is particularly challenging when the input face resolution is very low (e.g., 12×12 pixels), the magnification rate is high (e.g. 8×), and/or the face image is captured in an uncontrolled setting with pose and illumination variations.

Earlier super-resolution methods used image interpolation to obtain high-resolution images. These methods include nearest neighbor interpolation, bilinear interpolation and bicubic interpolation. Interpolation based image super-resolution produces smoothed images where details are of the image are lost or have inadequate quality. To obtain sharp high-resolution images, some methods used image sharpening filters such as bilateral filtering after the interpolation.

More recent methods used machine learning techniques to learn the parameters of the image super-resolution methods. The image super-resolution (SR) methods are developed for generic images, but can be used for face upsampling. In these methods local constraints are enforced as priors based on image statistics and exemplar patches. Global constraints are typically not available for the generic SR problem, which limits the plausible upsampling factor.

There are several super-resolution methods specific to face images. For example, one method uses a two-step approach for hallucinating faces. First a global face reconstruction is acquired using an eigenface model, which is a linear projection operation. In the second step details of the reconstructed global face is enhanced by non-parametric patch transfer from a training set where consistency across neighboring patches are enforced through a Markov random field. This method produces high-quality face hallucination results when the face images are near frontal, well aligned, and lighting conditions are controlled. However, when these assumptions are violated, the simple linear eigenface model fails to produce satisfactory global face reconstruction. In addition, the patch transfer does not scale well with large training datasets due to the nearest-neighbor (NN) patch search.

Another method uses a bi-channel convolutional neural network (BCCNN) for face upsampling. The method uses a standard convolutional neural network architecture that includes a convolution followed by fully connected layers, whose output is averaged with the bicubic upsampled image. The last layer of this network is fully connected where high-resolution basis images are averaged. Due to the averaging, person specific face details can be lost.

SUMMARY OF THE INVENTION

Some embodiments of the invention are based on recognition that the upsampling of the photorealistic high-resolution image, e.g., the image of a face, need to satisfy the following constraints. The first constraint is a global constraint that mandates that the reconstructed high-resolution face image need to satisfy holistic constraints such as shape, pose, and symmetry, and need to include detailed characteristic facial features such as eyes and nose. The second constraint is a local constraint that mandates that the statistics of the reconstructed local image regions need to match that of high-resolution face image patches, e.g., smooth regions with sharp boundaries, and should include face-specific details. The third constraint is a data constraint that mandates that the reconstruction need to be consistent with the observed low-resolution image and satisfy Equation (1). In this example, the constraints of the face are used, but the three constraints can be easily adapted to different types of the images.

Some embodiments are based on another realization that global features can be accurately recovered with fully connected neural network. However, the fully connected network combines a weighted average of upsampled images and smoothing out the face details. To that end, some embodiment use fully connected network for upsampling only global, e.g., high-frequency features of the image and determine local, e.g., low-frequency features using an interpolation. Some embodiments also fuse and filter the local and global features to produce high-resolution image.

Accordingly, one embodiment discloses a method for upsampling an image. The method includes upsampling the image using a non-linear fully connected neural network to produce only global details of an upsampled image; interpolating the image to produce a smooth upsampled image; concatenating the global details and the smooth upsampled image into a tensor; and applying a sequence of nonlinear convolutions to the tensor using a convolutional neural network to produce the upsampled image. The steps of the method are performed by a processor.

Another embodiment discloses a computer system for upsampling an image including a processor and a memory, wherein the instructions stored in the memory configure the processor to upsample the image using a non-linear fully connected neural network to produce only global details of an upsampled image;

interpolate the image to produce a smooth upsampled image; concatenate the global details and the smooth upsampled image into a tensor; and apply a sequence of nonlinear convolutions to the tensor using a convolutional neural network to produce the upsampled image.

DETAILED DESCRIPTION OF THE PREFERRED EMBODIMENT

Figure 1:
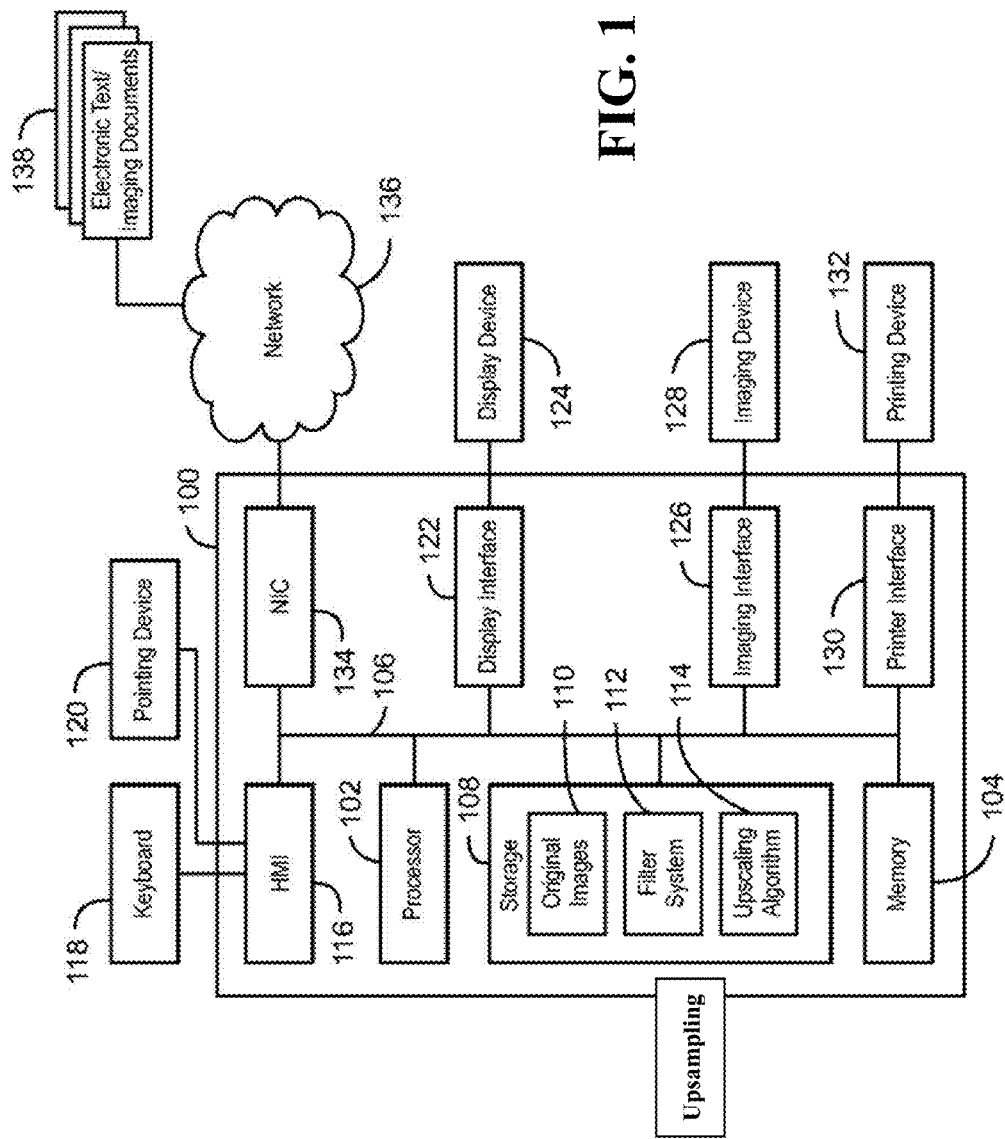
FIG. 1 is a block diagram of a computer system for upsampling an image in accordance with some embodiments of the invention.

FIG. 1 shows a block diagram of a computer system 100 for upsampling an image in accordance with some embodiments of the invention. The computer system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

These instructions implement a method for upsampling an image to produce upsampled image. In various embodiments, the upsampling includes creating a high-resolution image from a low-resolution image. For example, in one embodiment the image is a low-resolution image of a face, and the upsampled image is a high-resolution image of the face, wherein the high resolution is greater than the low resolution.

For example, given a low-resolution $N_L = n \times m$ face image $I_L$, the upsampling obtains a photorealistic high-resolution $N_H = (dn) \times (dm)$ face image $I_H$ whose down-sampled version is equal to $I_L$, where d is the upsampling factor. The relation between the low and high-resolution images can be written as $$x_L = K\, x_H, \tag{1}$$

where $x_L$ and $x_H$ are the low and high-resolution images stacked into column vectors and K is an $N_L \times N_H$ sparse matrix implementing low-pass filtering and down-sampling operations. To invert this largely ($d^2$-times) under-determined linear system and recover the high-resolution image, additional constraints are needed.

The computer system 100 can also include a storage device 108 adapted to store the original images 110, a filter 112 for filtering the original image to produce the image suitable for the upsampling. For example, the filter can resized and align the original image with the images of the training data. The storage device 108 can also store the structure and parameters 114 of the upsampling method. In various embodiments, the upsampling 114 approximates the solution of the linear inverse problem (1) using a deep neural network where constraints of the upsampling are explicitly modeled and learned using training data. The structure of the upsampling can include relationship between different components of the deep neural network. The parameters of the upsampling can include weights for different operations of the different components of the deep neural network.

The storage device 108 can include a hard drive, an optical drive, a thumbdrive, an array of drives, or any combinations thereof. A human machine interface 116 within the computer system 100 can connect the system to a keyboard 118 and pointing device 120, wherein the pointing device 120 can include a mouse, trackball, touchpad, joy stick, pointing stick, stylus, or touchscreen, among others. The computer system 100 can be linked through the bus 106 to a display interface 122 adapted to connect the system 100 to a display device 124, wherein the display device 124 can include a computer monitor, camera, television, projector, or mobile device, among others.

The computer system 100 can also be connected to an imaging interface 126 adapted to connect the system to an imaging device 128. In one embodiment, the image for upsampling is received from the imaging device. The imaging device 128 can include a camera, computer, scanner, mobile device, webcam, or any combination thereof. A printer interface 130 can also be connected to the computer system 100 through the bus 106 and adapted to connect the computer system 100 to a printing device 132, wherein the printing device 132 can include a liquid inkjet printer, solid ink printer, large-scale commercial printer, thermal printer, UV printer, or dye-sublimation printer, among others. A network interface controller 134 is adapted to connect the computer system 100 through the bus 106 to a network 136. Through the network 136, the images 138 including one or combination of the electronic text and imaging input documents can be downloaded and stored within the computer's storage system 108 for storage and/or further processing.

Some embodiments of the invention are based on recognition that the upsampling of the photorealistic high-resolution image, e.g., the image of a face, need to satisfy the following constraints. The first constraint is a global constraint that mandates that the reconstructed high-resolution face image need to satisfy holistic constraints such as shape, pose, and symmetry, and need to include detailed characteristic facial features such as eyes and nose. The second constraint is a local constraint that mandates that the statistics of the reconstructed local image regions need to match that of high-resolution face image patches, e.g., smooth regions with sharp boundaries, and should include face-specific details. The third constraint is a data constraint that mandates that the reconstruction need to be consistent with the observed low-resolution image and satisfy Equation (1). In this example, the constraints of the face are used, but the three constraints can be easily adapted to different types of the images.

Figure 2A:
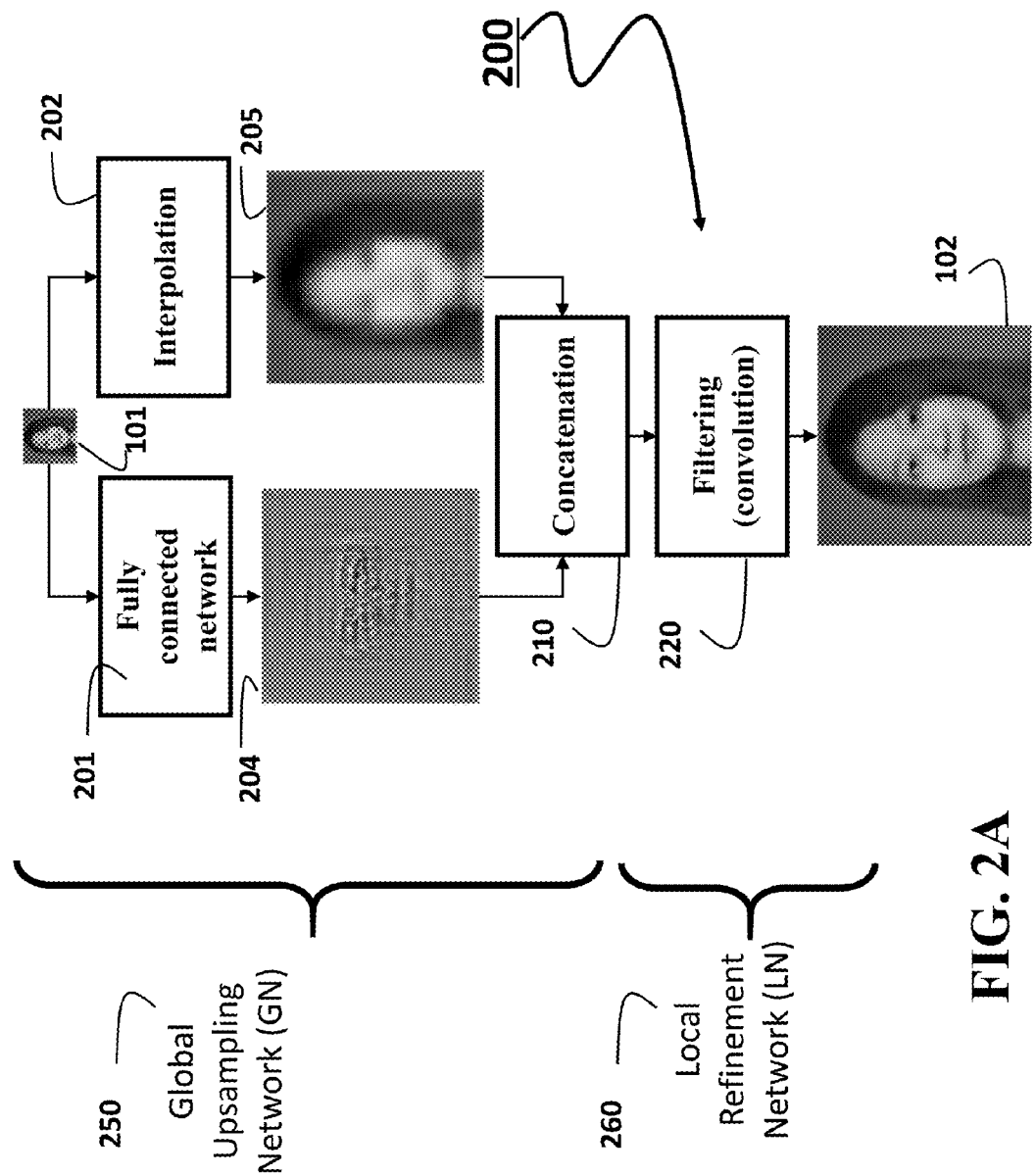
FIG. 2A is a block diagram of architecture of a global-local upsampling network (GLN) according to some embodiments of the invention.

FIG. 2A shows a block diagram of architecture of a deep neural network 200 according to some embodiments of the invention. Such architecture is referred herein as global-local upsampling network (GLN) to upsample a given low-resolution image 101. The components or submodules of this network are explicitly designed to enforce the above defined local and global constraints. For example, the GLN includes two sub-networks, referred to as Global Upsampling Network (GN) 250 and Local Enhancement Network (LN) 260, which model the global and local constraints for the upsampling. By jointly modeling and learning global and local constraints using a deep architecture, the accuracy of the upsampling is increased while preserving the efficiency of the feed-forward processing.

The GN includes a two-stream neural network running in parallel. The first stream implements a simple interpolation-based upsampling 202 of the low-resolution face producing a smooth image without details 205. The interpolation can have fixed weights such as nearest neighbor, bilinear or cubic interpolation. In some embodiments the interpolation weights are also learned using training data. The interpolation where the weights are learned is referred herein as a deconvolutional network. For example, the first stream implements an interpolation-based upsampling of the low-resolution face using a deconvolutional network, producing a smooth upsampled image without details.

The second stream produces the high frequency characteristic facial details, such as eyes and nose, using a non-linear fully connected neural network 201. Hidden layers of this network build a global representation of high-resolution face images that can be inferred from the low-resolution input 101. The multi-layer nonlinear embedding and reconstruction used by the network 201 enables more effective encoding of details of the upsampled image 204, such as characteristic facial features. In addition, variations such as alignment, face pose, and illumination can be effectively modelled. The two streams generated by GN are concatenated 210 to be processed by LN 260.

The local constraints are modeled in LN using a convolutional neural network 220, which implements a shift-invariant nonlinear filter. This network enhances the face-specific local details by fusing the smooth and detail layers produced by the GN. Even though the convolutional filters are relatively small, e.g., having areas of 5×5 or 7×7 pixels, by stacking many filters, the receptive field of the network becomes quite large. The large receptive field enables resolving the ambiguity (e.g., eye region vs. mouth region) and the deep architecture has enough capacity to apply necessary filtering operation to a given region.

LN enhances the face specific local details by fusing the smooth and detail layers produced by the GN. In some embodiments, the LN is a fully convolutional neural network which implements a shift invariant nonlinear filter. This network selects and applies the appropriate filtering operation for each face region (e.g., eye region vs. mouth region). To process the entire upsampled image, some embodiments pad each nonlinear convolution to the resolution of the of the upsampled image.

Figure 2B:
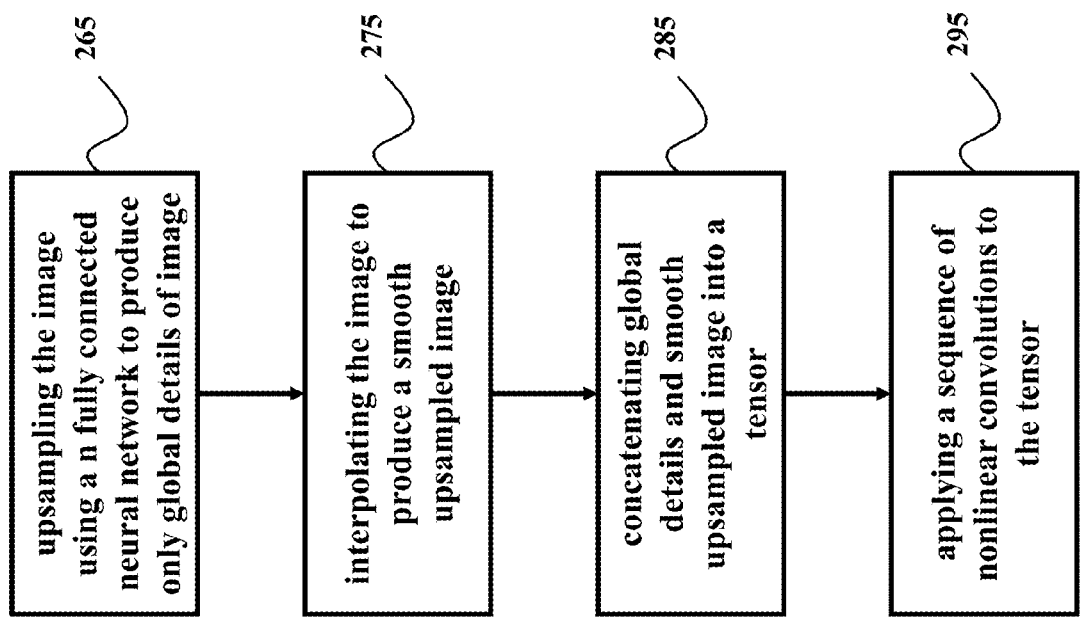
FIG. 2B is a block diagram of a method for upsampling an image using the GLN according to some embodiments of the invention.

FIG. 2B shows a block diagram of a method for upsampling an image using the GLN architecture according to some embodiments of the invention. The method upsamples 265 the image using a non-linear fully connected neural network to produce only global details of an upsampled image and also interpolates 275 the same image to produce a smooth upsampled image. The global details and the smooth upsampled image are concatenated 285 into a tensor and a sequence of nonlinear convolutions is applied to the tensor using a convolutional neural network to produce the upsampled image.

In some embodiments of the invention, the global details of the upsampled image encode high frequency details of the upsampled image to enforce global constraints on the upsampled image, and the smooth upsampled image encodes low frequency details of the upsampled image to enforce local constraints on the upsampled image. Additionally, the sequence of nonlinear convolutions enforces data constraints on the upsampled image.

Figure 3:
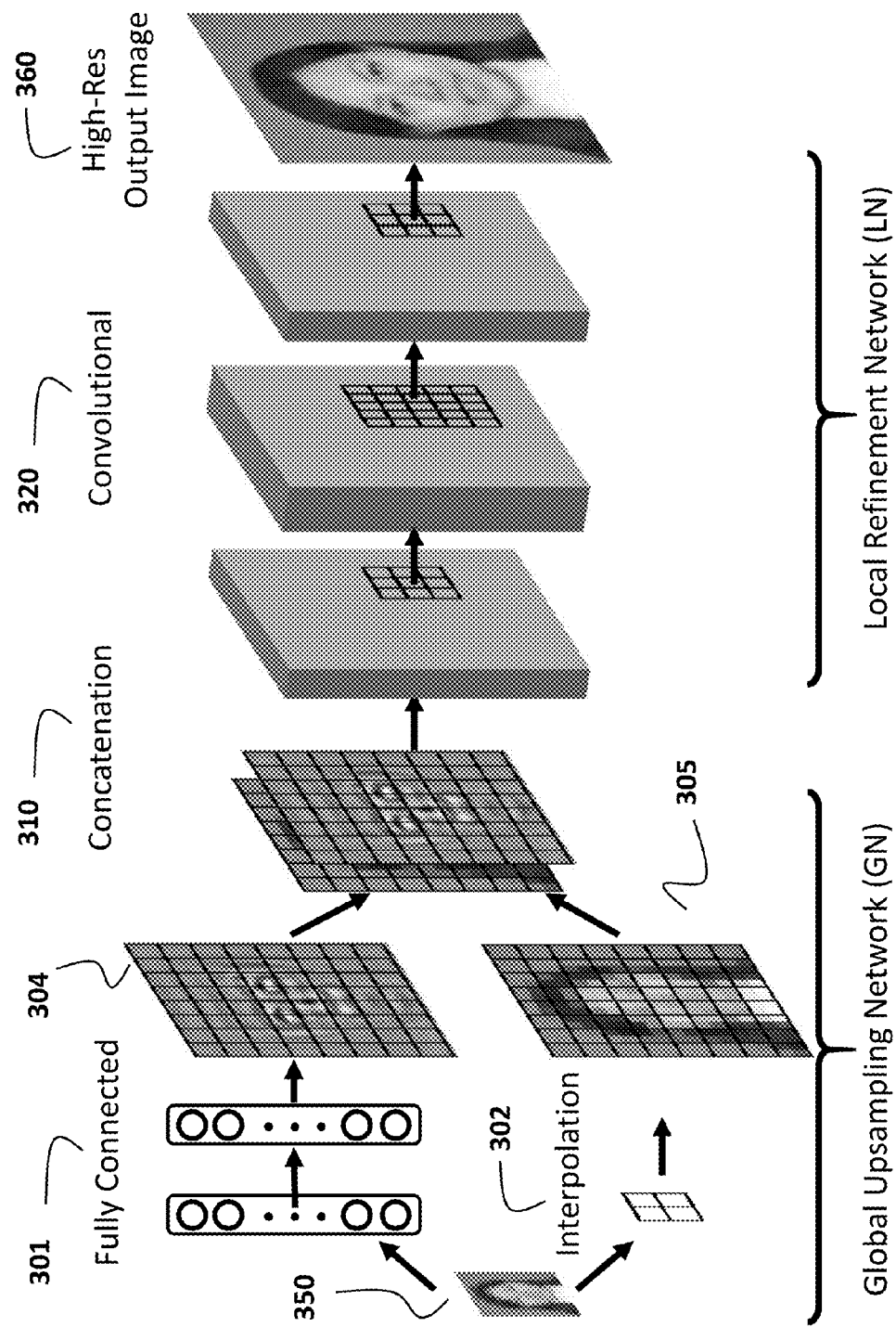
FIG. 3 is a schematic of implementation of GLN for face image upsampling according to some embodiments of the invention.

FIG. 3 shows a schematic of implementation of GLN for face image upsampling according to some embodiments of the invention. Although, the embodiments do not explicitly model the constraints within the network, by training the network using a large amount of training data, the network learns to produce high-resolution face images that are consistent with the low-resolution images according to Equation (1).

Figure 4A:
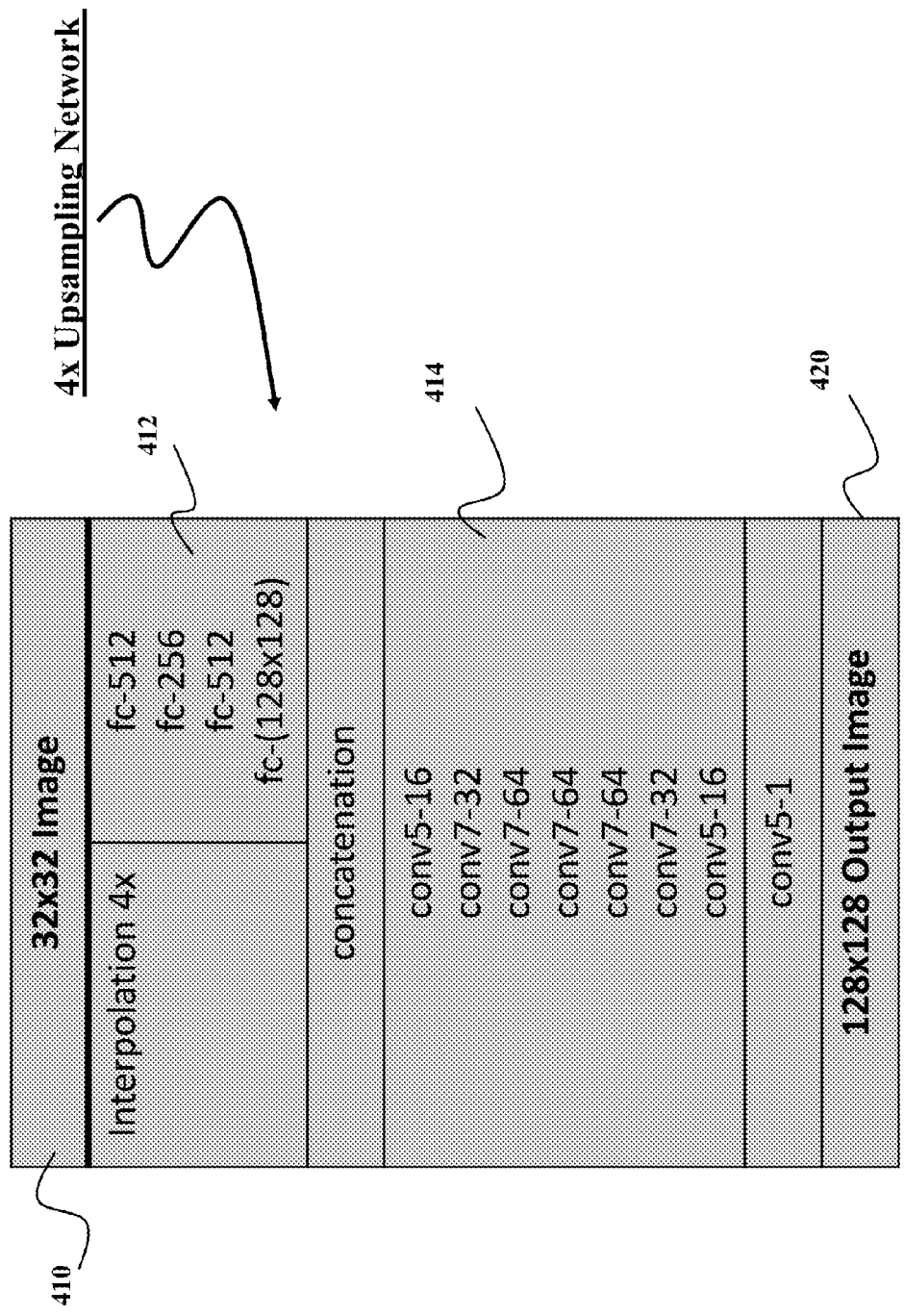
FIGS. 4A and 4B list some parameters for implementation of the GLN of FIG. 3 designed for very low-resolution input face images.
Figure 4B:
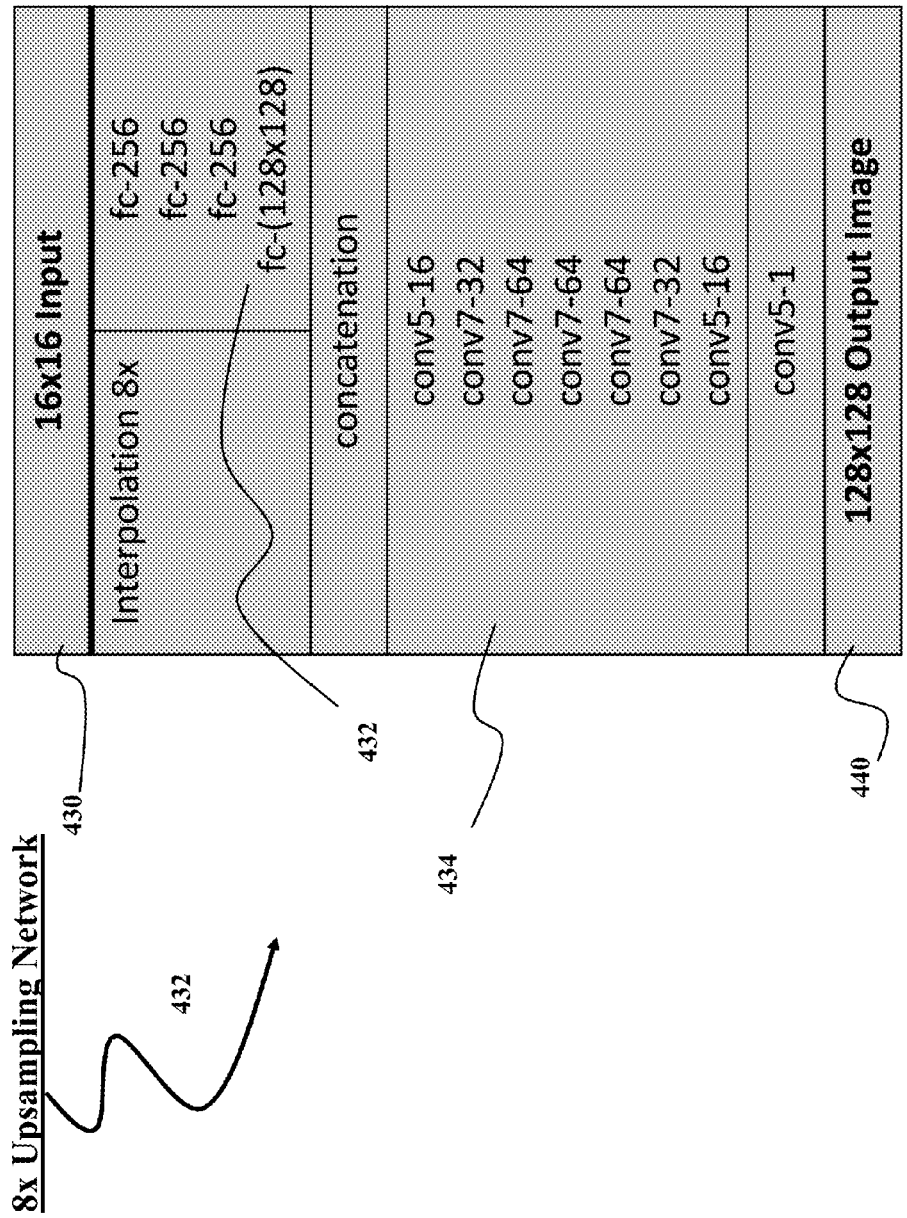

FIGS. 4A and 4B list some parameters for implementation of the GLN of FIG. 3 designed for very low-resolution input face images. Without loss of generality examples of FIGS. 4A and 4B consider two upsampling factors: (1) 4×upsampling of FIG. 4A where 32×32 input face image 410 is mapped to 128×128 resolution 420; (2) 8×upsampling of FIG. 4B where 16×16 input face image 430 is mapped to 128×128 resolution image 440. In those examples, the GLN is implemented using a four layer fully connected neural network GN 412 and 432 and eight layer convolutional neural network LN 414 and 434 with hidden layer parameters and convolution filter sizes. In those examples, fc-Z means a fully connected neural network layer with Z neurons and convY-U means a neural network layer with U convolutional filters each having an area of Y×Y pixels.

Global Upsampling Network (GN)

The GN is a two stream network running in parallel. The image interpolation stream 302 maps the low-resolution face image 350 to a high-resolution face image 360 using linear interpolation. Some embodiments implement the image interpolation stream using a deconvolution network where one pixel in low-resolution input image is locally connected to several pixels in high-resolution image. Each pixel in low-resolution input image is multiplied by a weight factor and added to the value of a connected pixel in the high resolution image. The interpolation weights can be initialized using bilinear weights but allow the weights to change during training FIG. 2A and FIG. 3 show a typical output 205 and 305 of the interpolation resulting in the smooth upsampling.

The global detail generation stream is implemented as a fully connected neural network 301 with one or several hidden layers. In the fully connected neural network all neurons in a given layer is connected to all neurons in the next layer. Some embodiments use rectified linear nonlinearity after every linear map except for the last layer which generates the 128×128-dimensional upsampled global detail. In our auto-encoder network the code layer is 256-dimensional, both for 4× and 8×upsampling networks 412 and 432. However, some other layers can have different dimensions. The output of the global detail generation stream 204 and/or 304 encodes high frequency details. The pattern is more visible around the characteristic facial features such as eyes, nose and mouth.

Concatenation

Some embodiments of the invention concatenate 310 the outputs of the image upsampling stream and the global detail generation stream, and form a 2×128×128 tensor to be processed by the LN.

Local Refinement Network (LN)

The local constraints are modeled in LN using a convolutional neural network 320, which implements a shift-invariant nonlinear filter. Before each convolution operation the image is padded with the ceiling of the half filter size so that the output image dimension is same as the input dimension. After every convolutional layer some embodiments apply rectified linear non-linearity except the last layer which constructs the final upsampled image. The LN enhances the face specific local details by fusing the smooth and detail layers produced by the GN. In addition, the reconstructed image's local statistics match that of high-resolution face image patch statistics (e.g., smooth cheek region and sharp face boundaries).

One embodiment of the invention ensures that the upsampling operator results in the high-resolution image that is consistent with the low-resolution image. Even though the deep face upsampling network learns to produce high-resolution image that is consistent with the low-resolution input, the embodiment makes consistency a hard constraint using a post-processing operation. To that end, the embodiment finds the closest image in the subspace of feasible high-resolution solutions (Equation (1)) that is consistent with the low-resolution input image.

Training

In some embodiments of the invention, the fully connected network, the interpolation, and the convolution are concurrently trained to reduce an error between upsampled set of images and corresponding set of high-resolution images. For example, in one embodiment, the fully connected network is a neural network, and wherein the training produces weights for each neuron of the neural network. Additionally or alternatively, in one embodiment, the interpolation uses different weights for interpolating different pixels of the image, and wherein the training produces the different weights of the interpolation. Additionally or alternatively, in one embodiment, the training produces weights for each neuron of the sequence of nonlinear convolutions.

Figure 5:
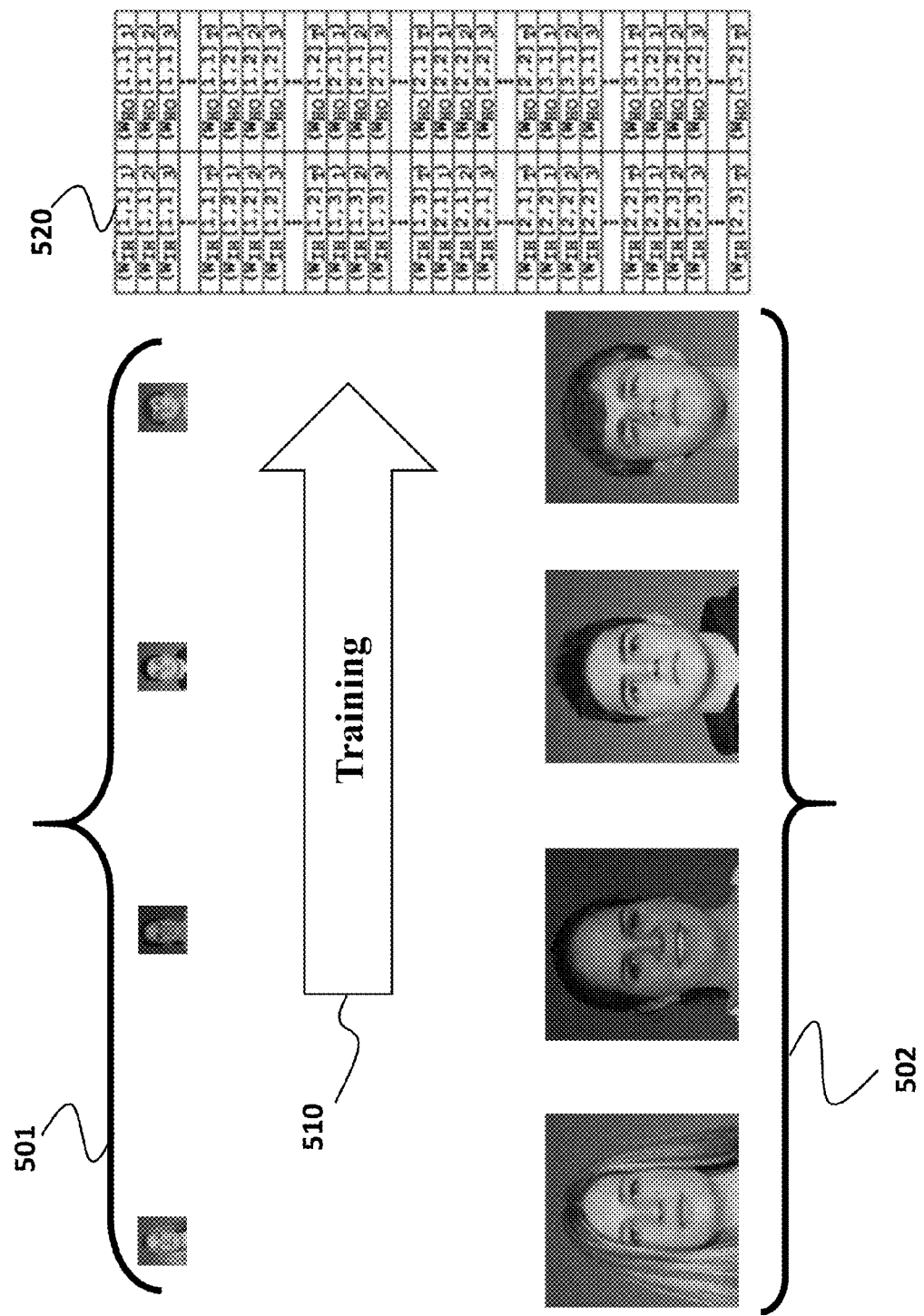
FIG. 5 is a schematic of the training used by some embodiments of the invention.

FIG. 5 shows a schematic of the training used by some embodiments of the invention. The training 510 uses a training set of pairs of low-resolution images 501 and corresponding high-resolution ground-truth image 502 to produce the weights 520 of the GLN. In general, training an artificial-neural-network comprises applying a training algorithm, sometimes referred to as a "learning" algorithm, to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner.

Training the neural network involves computing the weight values associated with the connections in the artificial-neural-network. To that end, unless herein stated otherwise, the training includes electronically computing weight values for the connections in the fully connected network, the interpolation and the convolution.

Figure 6:
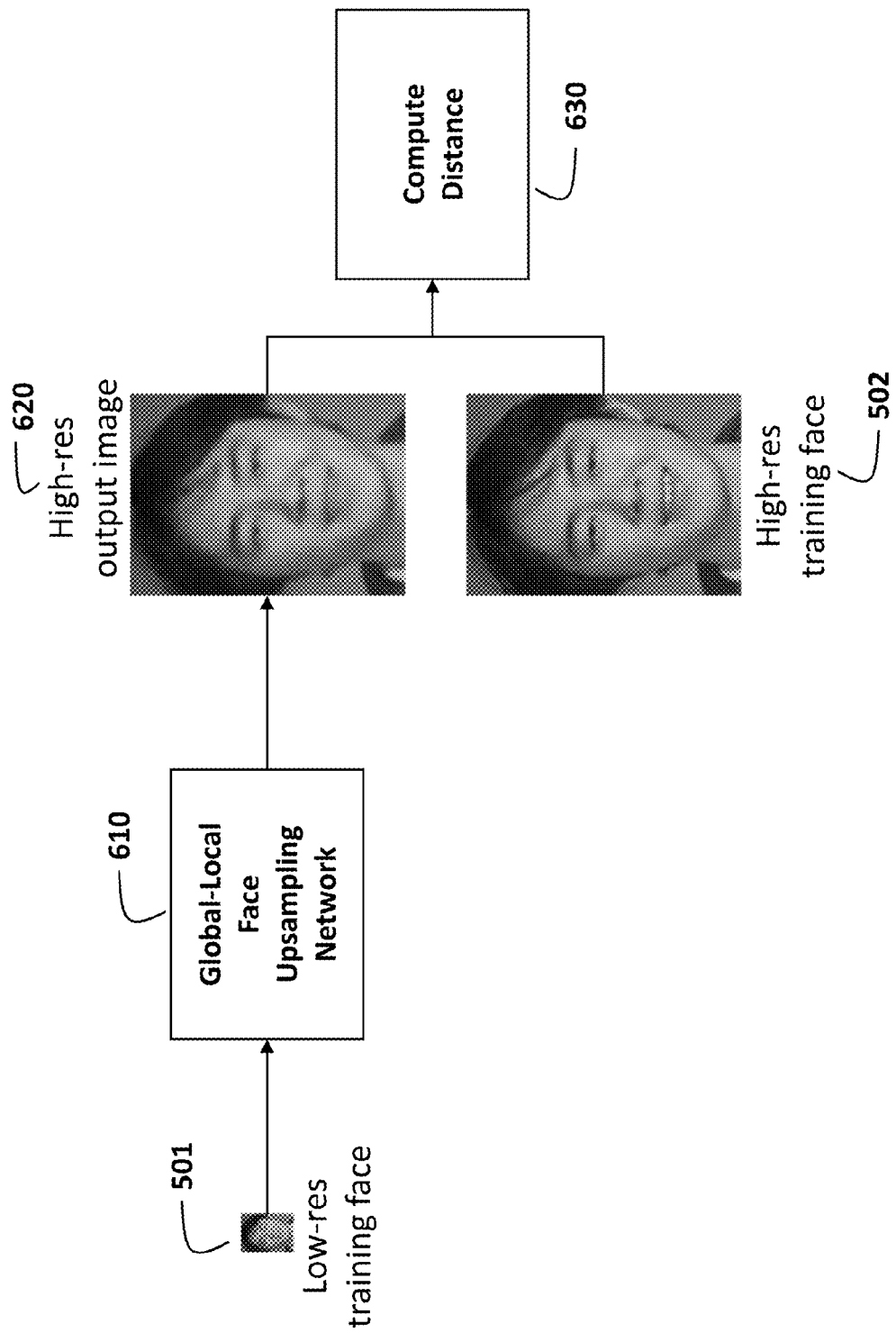
FIG. 6 is a block diagram of the training method used by some embodiments of the invention.

FIG. 6 shows a block diagram of the training method 510 used by some embodiments of the invention. The method upsamples the low-resolution image from the set 510 using the GLN 200 (or 610) to produce the upsampled image 620 and compares the upsampled image 620 with the corresponding high-resolution image from the set 502 to produce a distance 630 between the two high-resolution images. For example, one embodiment determines Euclidean distance between two images or negative of the Peak Signal to Noise Ratio (PSNR) score. The network is trained using an optimization procedure to minimize the distances 630 with respect to network parameters. The optimization can be done using various different methods including gradient descent, stochastic gradient descent, and Newton's method.

Figure 7:
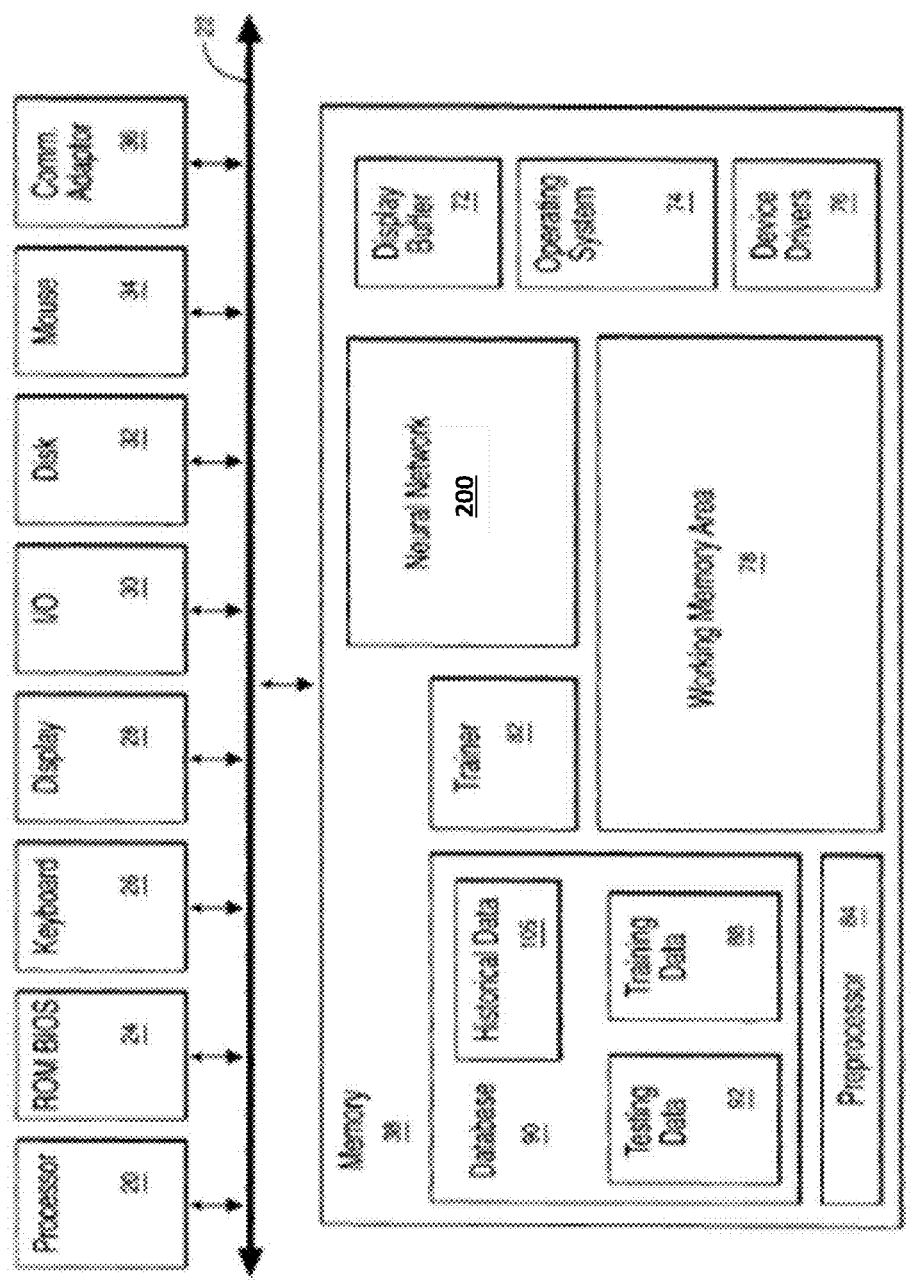
FIG. 7 is a block diagram of a training system according to one embodiment of the invention.

FIG. 7 shows a block diagram of a training system according to one embodiment of the invention. The training system includes a processor connected by a bus 22 to a read only memory (ROM) 24 and a memory 38. The training system can also include are a display 28 to present information to the user, and a plurality of input devices including a keyboard 26, mouse 34 and other devices that may be attached via input/output port 30. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, the GLN 200, preprocessor 84. The database 90 can include the historical data 105, training data, testing data 92. The database may also include results from operational, training or retaining modes of using the neural network. These elements have been described in detail above.

Also shown in memory 38 is the operating system 74. Examples of operating systems include AIX, OS/2, and DOS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 101, trainer 82, the operating system 74 and other functions. The working memory area 78 may be partitioned amongst the elements and within an element. The working memory area 78 may be utilized for communication, buffering, temporary storage, or storage of data while a program is running The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:
1. A method for upsampling an image, comprising:
   upsampling the image using a non-linear fully connected network to produce only global details of an upsampled image;
   interpolating the image to produce a smooth upsampled image;
   concatenating the global details and the smooth upsampled image into a tensor; and
   applying a sequence of nonlinear convolutions to the tensor using a convolutional neural network to produce the upsampled image, wherein steps of the method are performed by a processor.
2. The method of claim 1, wherein the fully connected network, the interpolation, and the convolution are concurrently trained to reduce an error between upsampled set of images and corresponding set of high-resolution images.

3. The method of claim 2, wherein the fully connected network is a neural network, and wherein the training produces weights for each neuron of the neural network.

4. The method of claim 2, wherein the interpolation uses different weights for interpolating different pixels of the image, and wherein the training produces the different weights of the interpolation.

5. The method of claim 2, wherein the training produces weights for each neuron of the sequence of nonlinear convolutions.

6. The method of claim 5, further comprising:
padding each nonlinear convolution in the sequence to the resolution of the of the upsampled image.

7. The method of claim 1, wherein the global details of the upsampled image encode high frequency details of the upsampled image to enforce global constraints on the upsampled image, and wherein the smooth upsampled image encodes low frequency details of the upsampled image to enforce local constraints on the upsampled image.

8. The method of claim 7, wherein the sequence of nonlinear convolutions enforces data constraints on the upsampled image.

9. The method of claim 1, wherein the image is a low resolution image of a face, and wherein the upsampled image is a high resolution image of the face, wherein the high resolution is greater than the low resolution.

10. The method of claim 1, further comprising:
receiving the image from an imaging device; and
rendering the upsampled image onto a display device.

11. The method of claim 10, wherein the imaging device includes one or combination of a camera, a computer, a scanner, a mobile device, and a webcam, and wherein the display device includes one or combination of a computer monitor, the camera, a television, a projector, or a mobile device.

12. The method of claim 1, further comprising:
filtering an original image to produce the image.

13. A computer system for upsampling an image including a processor and a memory, wherein the instructions stored in the memory configure the processor to
upsample the image using a non-linear fully connected network to produce only global details of an upsampled image;
interpolate the image to produce a smooth upsampled image;
concatenate the global details and the smooth upsampled image into a tensor; and
apply a sequence of nonlinear convolutions to the tensor using a convolutional neural network to produce the upsampled image.

14. The system of claim 13, wherein the fully connected network, the interpolation, and the convolution are concurrently trained to reduce an error between upsampled set of images and corresponding set of high resolution images.

15. The system of claim 14, wherein the fully connected network is a neural network, and wherein the training produces weights for each neuron of the neural network, wherein the interpolation uses different weights for interpolating different pixels of the image, and wherein the training produces the different weights of the interpolation, and wherein the training produces weights for each neuron of the sequence of nonlinear convolutions.

16. The system of claim 13, wherein the global details of the upsampled image encode high frequency details of the upsampled image to enforce global constraints on the upsampled image, wherein the smooth upsampled image encodes low frequency details of the upsampled image to enforce local constraints on the upsampled image, and wherein the sequence of nonlinear convolutions enforces data constraints on the upsampled image.

17. The system of claim 13, wherein the image is a low resolution image of a face, and wherein the upsampled image is a high resolution image of the face, wherein the high resolution is greater than the low resolution.

18. The system of claim 13, further comprising:
an imaging device to determine the image; and
a display device to display the upsampled image.

19. The system of claim 18, wherein the imaging device includes one or combination of a camera, a computer, a scanner, a mobile device, and a webcam, and wherein the display device includes one or combination of a computer monitor, the camera, a television, a projector, or a mobile device.

20. The system of claim 13, further comprising:
a filter for filtering an original image to produce the image.

* * * * *